Jan. 2, 1962  T. GRETHER  3,015,187
SUGARCANE TYING MACHINE
Filed Aug. 1, 1960  4 Sheets-Sheet 1

INVENTOR.
TOBIAS GRETHER
BY
Hazard & Miller
ATTORNEYS

Jan. 2, 1962  T. GRETHER  3,015,187
SUGARCANE TYING MACHINE
Filed Aug. 1, 1960  4 Sheets-Sheet 2

INVENTOR.
TOBIAS GRETHER
BY Hazard & Miller
ATTORNEYS

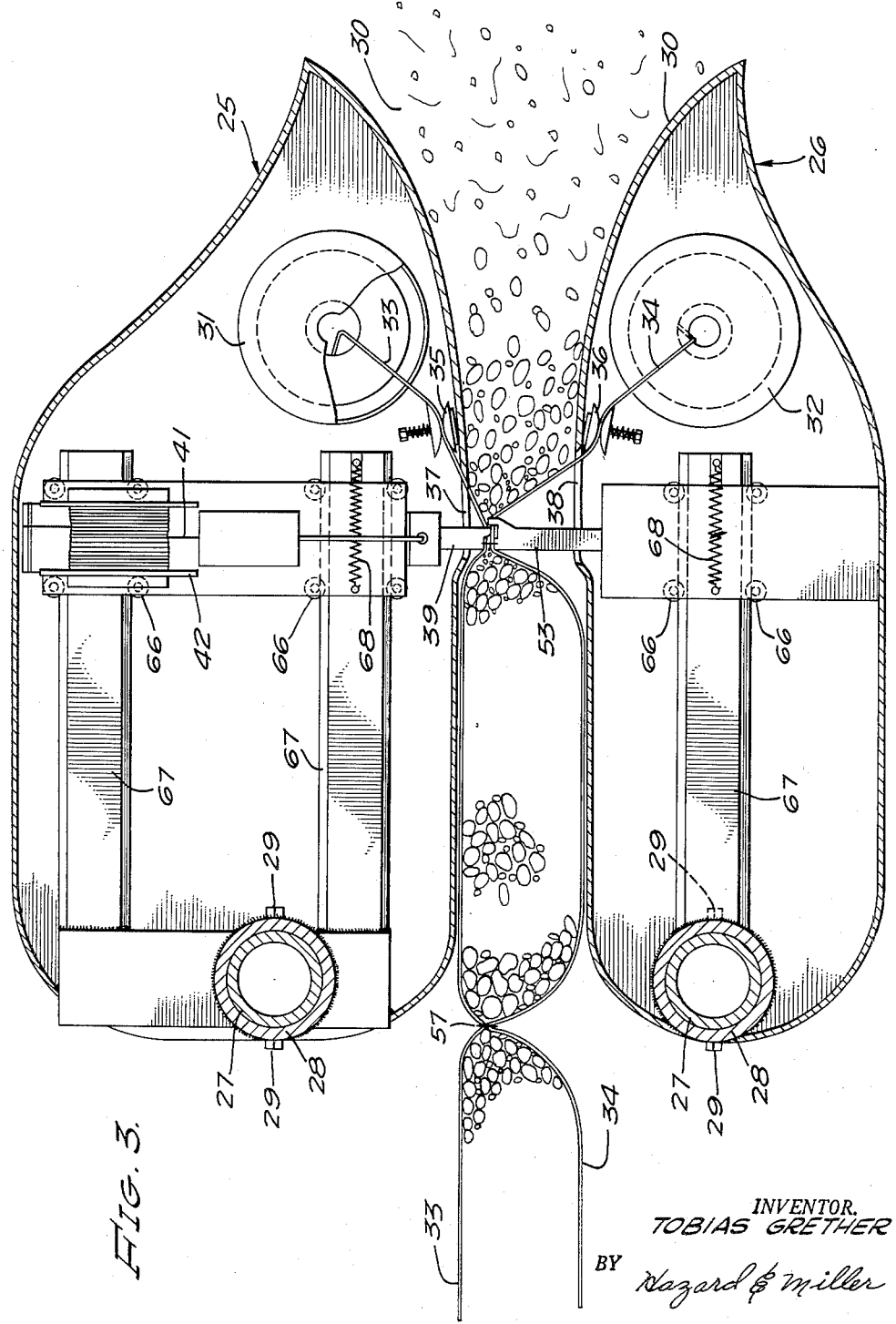

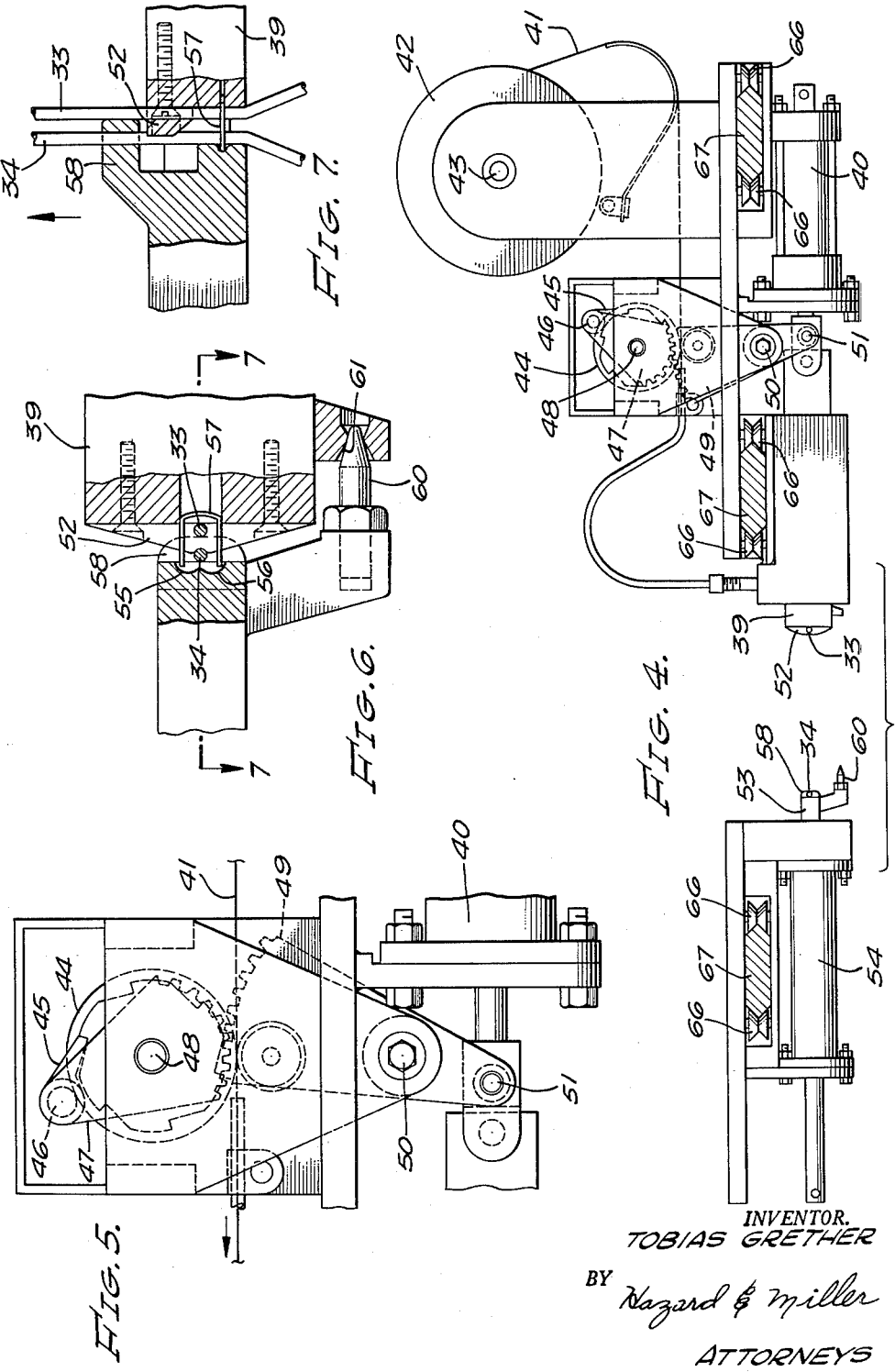

United States Patent Office 3,015,187
Patented Jan. 2, 1962

3,015,187
SUGARCANE TYING MACHINE
Tobias Grether, Rte. 2, Box 182A, Camarillo, Calif.
Filed Aug. 1, 1960, Ser. No. 46,422
9 Claims. (Cl. 47—1)

This invention relates to a machine for tying vegetation that has been planted in rows.

Explanatory of the present invention, sugarcane is conventionally planted in longitudinally extending rows and has heretofore been allowed to grow naturally in such rows. However, when the sugarcane becomes fairly tall, many stalks become weakened and are disposed to fall in a more or less helter skelter fashion prior to harvesting. This may occur for any one of a number of different reasons. When the sugarcane falls in this manner it interferes with the harvesting and a considerable amount of otherwise available sugar becomes lost.

I have heretofore proposed tying the sugarcane with flexible burnable elements arranged on opposite sides of the sugarcane in a row, thus dividing the sugarcane in a row into a succession of groups of stalks. Each group is held together by the tying elements and the stalks of each group tend to mutually support each other until the time of harvest. At the time of harvest the conventional practice is to burn off the foliage of the sugarcane and as the tie elements are formed of burnable material, they will likewise be burned during the burning, thus releasing the stalks of sugarcane and making them readily available for harvest.

A primary object of the present invention is to provide a machine that will easily and economically enable flexible elements which are preferably burnable to be fed along opposite sides of a row of vegetation such as sugarcane and which will cause them to be fastened together at spaced intervals along the row to thus tie the stalks of the row together in the form of groups of stalks which will mutually tend to support each other.

More specifically, an object of the invention is to provide a machine which will feed the flexible elements along opposite sides of a row of vegetation and which has a fastening means which causes the flexible elements to be moved into close proximity to each other at spaced intervals along the row, which fastening means will effect a fastening of the flexible elements together. As the fastening operation occurs while it is being carried by a continuously moving carriage, the fastening means may be required to remain stationary while it is effecting a fastening of the flexible elements. To this end, the fastening means is movably mounted on the carriage for movement in a direction longitudinally of the row so that it may remain stationary with respect to the flexible elements while the fastening occurs. However, on completion of the fastening operation, means is provided for returning the fastening means to a normal predetermined position with respect to the continuously moving carriage.

With the foregoing and other objects in view, which will be made manifest in the following detailed description and specifically pointed out in the appended claims, reference is had to the accompanying drawings for an illustrative embodiment of the invention, wherein:

FIG. 3 is a horizontal section taken substantially upon the line 3—3 upon FIG. 2 in the direction indicated;

FIG. 4 is a view taken substantially upon the line 4—4 upon FIG. 1 in the direction indicated;

FIG. 5 is a partial view illustrating a detail of construction;

FIG. 6 is a partial view largely in vertical section and illustrating the manner in which the fastening of the opposed flexible elements is effected; and FIG. 7 is a partial view in horizontal section taken substantially upon the line 7—7 upon FIG. 6 in the direction indicated.

Figure 1:
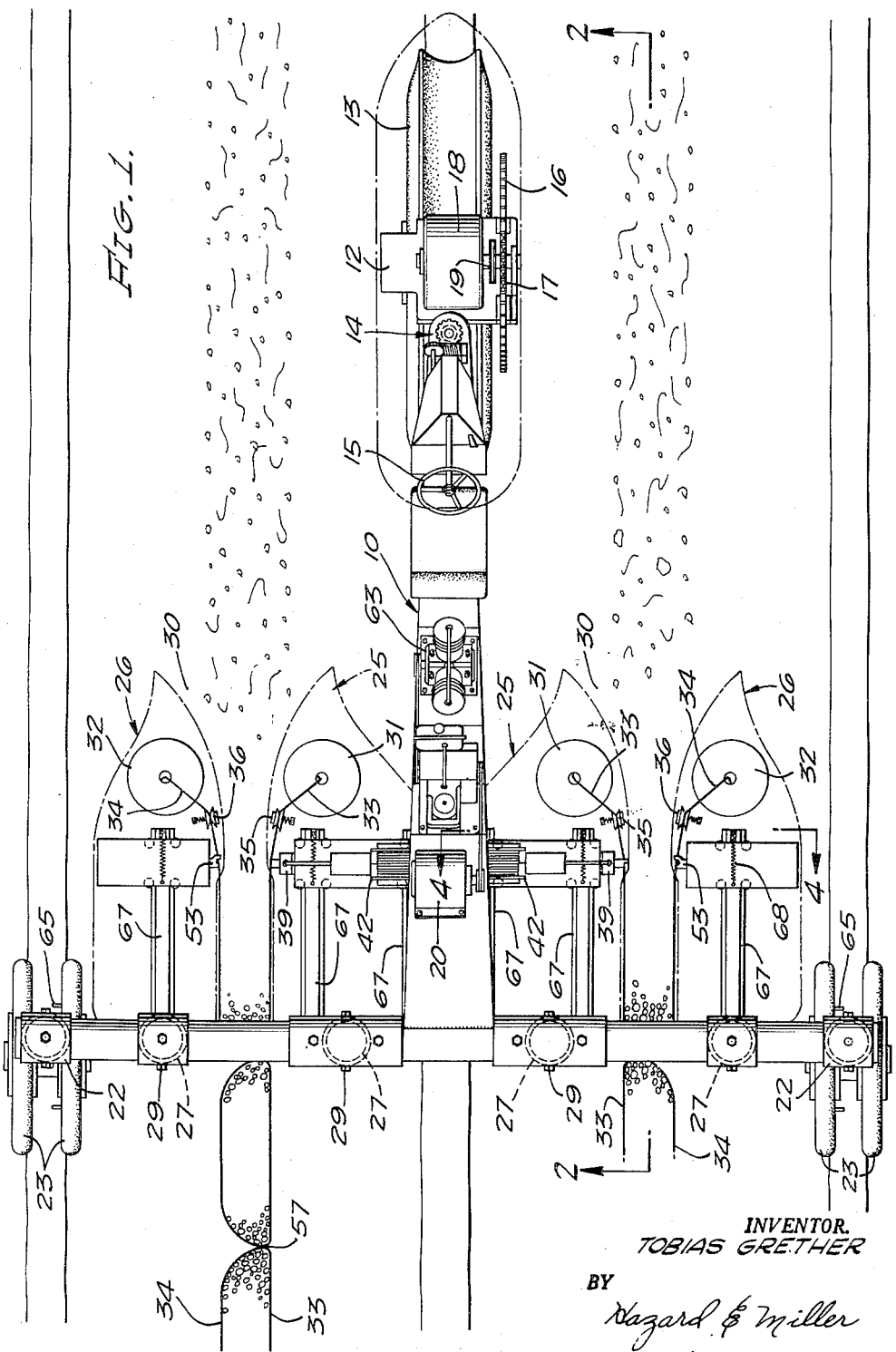
FIGURE 1 is a top plan view of a machine embodying the present invention, parts being broken away and shown in horizontal section.
Figure 2:
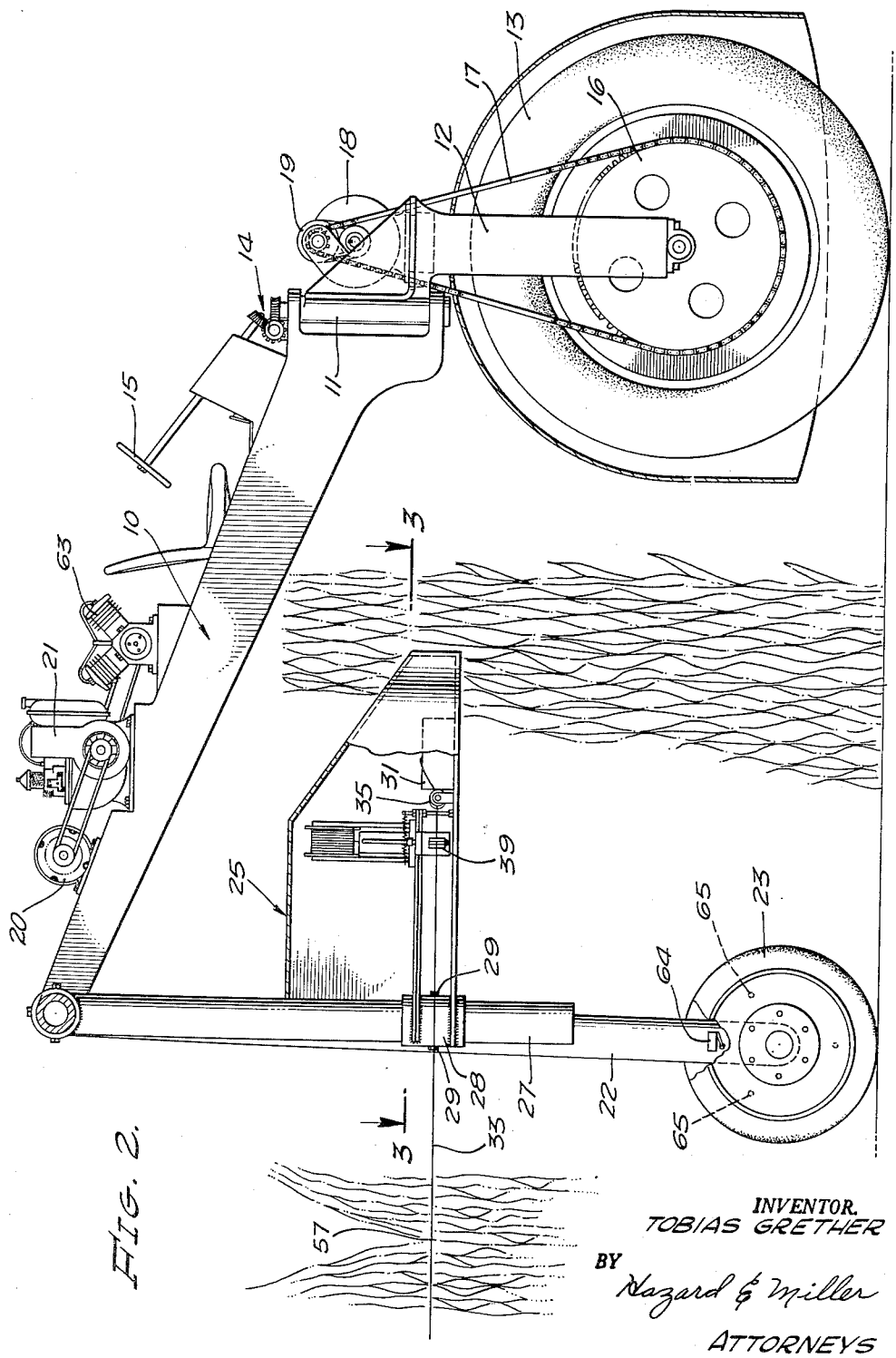
FIG. 2 is a vertical section taken substantially upon the line 2—2 upon FIG. 1 in the direction indicated.

Referring to the accompanying drawings wherein similar reference characters designate similar parts throughout, the improved machine consists of a continuously movable carriage that is movable longitudinally of a row of vegetation such as sugarcane. This carriage is illustrated as consisting of a central frame 10 at the forward end of which there is pivotally mounted such as by a knuckle 11 a fork 12 that serves to rotatably mount a forward ground wheel 13. The fork 12 can be rotated for steering purposes through steering gearing 14 by means of a steering wheel 15.

The front ground wheel 13 preferably constitutes the drive wheel for the carriage and is equipped with a sprocket 16 driven by an endless chain 17 from a source of power such as an electric motor 18 provided with a speed reducer 19. When an electric motor is employed, as the power source, it is preferably supplied with electric current generated by an electric generator 20 conveniently mounted on the frame 10 and driven by an internal combustion engine 21 which is also mounted on the main frame. Other means may be employed for driving the front wheel 13 if desired.

At the rear of the main frame 10 there is an inverted U-shaped frame 22, the lower ends of which have ground wheels 23 rotatably mounted thereon. The spacing between the ground wheels 23 and the track of the front wheel 13 is preferably equal to the spacing between rows of sugarcane as conventionally planted so that the front wheel 13 may roll down between two adjacent rows and the ground wheels 23 may roll down the outer sides of said adjacent rows. The inverted U-shaped frame serves to adjustably support or suspend pairs of housings, one pair for each row of vegetation. As these pairs of housings are counterparts of each other only one pair need be described.

Housings 25 and 26 are mounted on suspending members 27 that are on the U-shaped frame by means of sleeves 28. These are held in adjusted position such as by bolts or set screws 29 so that the housings may be adjusted to various elevations. The forward ends of the housings diverge to form a forwardly open throat 30 between which the stalks of sugarcane or other vegetation may pass. In the forward ends of the housings there are containers 31 and 32, respectively, designed to contain supply rolls or balls of heavy burnable, flexible material in the form of heavy cord or light rope.

This cord indicated at 33 and 34, respectively, passes through spring-actuated tensioning devices 35 and 36 respectively, and outwardly through opposed openings 37 and 38 in opposed walls of the housings. In this manner, the flexible and burnable elements 33 and 34 are drawn in a taut manner against opposite sides of the sugarcane stalks in a row of sugarcane.

In one of the housings, such as the housing 25, there is disposed an air-actuated stapling head or hog-ringing head 39 that is reciprocated or actuated by the piston of a pneumatic cylinder 40. This stapling or hog-ringing head is supplied with wire 41 from a supply roll 42 that is rotatably mounted as at 43. The wire is fed toward the head by a feed roll 44 which is caused to advance the wire by a step-by-step motion by a pawl 45 pivoted at 46 on a gear segment 47 that is pivotally mounted at 48 for swinging movement coaxially with the axis of rotation of the feed roll. The gear segment 47 is actuated by an opposed gear segment 49 pivoted at 50 and connected as at 51 to the connection between the piston in pneumatic cylinder 40 and the head 39. In this manner, each time that the head 39 is actuated and is caused to advance then to retract by the piston in the pneumatic cylinder 40 on additional increment of wire 41 will be fed toward the head. A portion of this wire is cut off to form a heavy staple or hog-ring which is deposited in the head to be carried forward thereby the next time that the head is advanced.

The details of construction of the stapler or hog-ring applicator form no important part of the present invention and therefore have not been illustrated herein. Any stapler or hog-ring applicator which can cut and form a staple or hog-ring from a continuous wire supply may be employed.

At one side of the head 39 there is formed a guide 52 through which the flexible element 33 is trained so that each time the head 39 is advanced into the row of sugarcane stalks the flexible element 33 will be carried inwardly by the head and held thereby at the proper elevation.

In the opposed housing 26 there is disposed an anvil member 53 which is also advanced and retracted by the piston within a pneumatic cylinder 54. This anvil member presents anvil surfaces 55 and 56 which are engageable by the ends of the staple or hog-ring formed from the wire 41, one of which is illustrated at 57 in FIG. 6. The anvil member also has a guide 58 adjacent the anvil surfaces which serves to guide the flexible element 34 and when the anvil member is advanced the flexible element 34 will likewise be caused to enter the row of sugarcane stalks. In this manner the two guides 52 and 58 will cause the flexible elements 33 and 34 to be brought into close proximity to each other at spaced intervals along the row. At the same time the staple or hog-ring which has been formed from the wire 41 is carried by the head 39 into engagement with the anvil 54 so that the legs thereof will be caused to clinch around and thus fasten the two flexible elements 33 and 34 together. As a means of assuring alignment of the anvil member relatively to the head 39 the anvil is preferably provided with a guide pin 60 adapted to enter an aperture 61 in the head and thus cause the two opposed reciprocable parts to be mutually aligned at the time that the staple or hog-ring is being clinched around the flexible elements.

The two pneumatic cylinders 40 and 54 are supplied with compressed air from an air compressor 63 that is also driven off of the internal combustion engine 21. Adjacent one of the ground wheels 23 there is an electric switch 64 engageable by a cam or the equivalent 65 on the ground wheel. This switch is in circuit with a solenoid valve or the equivalent, not shown, which controls the supply of compressed air to the pneumatic cylinders 40 and 54, causing the pistons therein to be actuated at periodic intervals. In this manner, the ground wheel 23 serves not only as a ground wheel to support the rear of the frame but also serves as a measuring wheel to cause the stapler or hog-ring applicator to be actuated at regular intervals.

In the course of fastening the two flexible elements 33 and 34 together at spaced intervals along the length of the row, the head 39 and the anvil 53 may be required to remain stationary with respect to the flexible elements while the tie or clinching is being completed. To this end, the head 39 and the anvil 53 together with their associate structure including the pneumatic cylinders 40 and 54 are mounted for movement longitudinally of the carriage. Thus, these parts may be equipped with V-shaped rollers 66 which roll against V-shaped edges on rails 67 that are mounted within the housing. Tension springs 68 or the equivalent yieldably urge the head 39 and its associated structure and anvil 53 and its associated structure into a predetermined forwardmost position but while a tie is being effected across the two flexible elements 33 and 34 these springs permit these parts to move rearwardly while the carriage continues its forward movement until the tie is completed. Then, when the anvil and head mutually recede from each other the spring 68 may return these parts to their normal positions.

From the above-described construction it will be appreciated that a machine has been provided for feeding two opposed burnable, flexible elements along opposite sides of a row of sugarcane. Furthermore, these flexible elements may be brought together or in close proximity to each other at spaced intervals along the length of the row and fastened together, thus dividing the row into groups of stalks which cooperate to mutually support each other against falling or toppling over. It is not essential that the head 39 and anvil 53 advance equal distances, and in the construction shown I have illustrated the head as having advanced a greater distance than the anvil. In some forms of construction the anvil need not advance at all and the head may be employed to carry its flexible element 33 entirely through the row of vegetation to bring it into close proximity to the opposed flexible element 34 and to have the two elements fastened together while thus in close proximity to each other. Usually at the start of a row a post or some equivalent stationary structure is driven into the ground to tie the flexible elements 33 and 34 thereto. However, after the first few groups of cane stalks have been tied together by the machine further use of such a post is unnecessary.

Various changes may be made in the details of construction without departing from the spirit and scope of the invention as defined in the appended claims.

I claim:

1. A machine for tying vegetation that is in a row comprising a carriage movable lengthwise of the row, means on the carriage for bringing two opposed flexible elements on opposite sides of the row into close proximity with each other at spaced intervals along the length of the row as the carriage proceeds along the row, and fastening means on the carriage for fastening the flexible elements together while they are held in close proximity to each other.

2. A machine for tying vegetation that is in a row comprising a carriage movable lengthwise of the row, opposed members on the carriage at least one of which is movable toward and away from the other, guide means on said members for holding two flexible elements disposed on opposite sides of the row at approximately the same elevation and for bringing said flexible elements into close proximity with each other when the said opposed member is moved toward the other, and fastening means on the carriage for fastening the elements together while they are held by the guide means in close proximity to each other.

3. A machine for tying vegetation that is in a row comprising a carriage movable lengthwise of the row, opposed members on the carriage at least one of which is movable toward and away from the other, guide means on said members for holding two flexible elements disposed on opposite sides of the row at approximately the same elevation and for bringing said flexible elements into close proximity with each other when the said opposed member is moved toward the other, fastening means on the carriage for fastening the elements together while they are held by the guide means in close proximity to each other, said opposed members and fastening means being mounted on the carriage for movement relative thereto in a direction longitudinally of the row, and means yieldably urging the opposed members into a predetermined position relative to the carriage.

4. A machine for tying vegetation that is in a row comprising a carriage movable lengthwise of the row, means on the carriage for bringing two opposed flexible elements on opposite sides of the row into close proximity with each other at spaced intervals along the length of the row as the carriage proceeds along the row, fastening means on the carriage for fastening the flexible elements together while they are held in close proximity to each other, said means and fastening means being mounted on the carriage for movement relative thereto in a direction longitudinal of the row, and means yieldably urging said means and fastening means into a predetermined position relative to the carriage.

5. A machine for tying vegetation that is in a row comprising a carriage movable lengthwise of the row, means on the carriage for feeding flexible elements adjacent opposite sides of the row, means on the carriage for bringing said flexible elements into close proximity with each other at spaced intervals along the length of the row as the carriage moves therealong, and fastening means on the carriage for fastening said flexible elements together while they are in close proximity with each other.

6. A machine for tying vegetation that is in a row comprising a carriage having ground wheels movable along the length of the row, means on the carriage for feeding flexible elements against opposite sides of the row of vegetation as the carriage moves therealong, and fastening means on the carriage for fastening said elements together at spaced intervals along the row as the carriage moves therealong.

7. A machine for tying vegetation that is in a row comprising a carriage having ground wheels movable along the length of the row, means on the carriage for feeding flexible elements against opposite sides of the row of vegetation as the carriage moves therealong, fastening means on the carriage for fastening said elements together at spaced intervals along the row as the carriage moves therealong, the fastening means being mounted on the carriage for movement relative thereto in a direction longitudinal of the row, and means yieldably urging the fastening means into predetermined position relative to the carriage.

8. A machine for tying vegetation that is in a row comprising a carriage having ground wheels movable along the length of the row, means on the carriage for feeding flexible elements against opposite sides of the row of vegetation as the carriage moves therealong, fastening means on the carriage for fastening said elements together at spaced intervals along the row as the carriage moves therealong, the fastening means being mounted on the carriage for movement relative thereto in a direction longitudinal of the row, and means for returning the fastening means to a predetermined position relative to the carriage when it is displaced therefrom.

9. A machine for tying vegetation that is in a row comprising a carriage having ground wheels movable along the length of the row, means on the carriage for feeding flexible elements against opposite sides of the row of vegetation as the carriage moves therealong, and fastening means on the carriage for fastening said elements toegther at spaced intervals along the row as the carriage moves therealong operable by the rotation of a ground wheel.

References Cited in the file of this patent
UNITED STATES PATENTS
2,241,494   Volante _____ May 13, 1941